United States Patent
Kulkarni et al.

(10) Patent No.: US 9,323,627 B1
(45) Date of Patent: Apr. 26, 2016

(54) SYSTEM, METHOD, AND APPARATUS FOR DETECTING FAULT CONDITIONS EXPERIENCED BY REMOTE PHYSICAL PORTS

(71) Applicant: Juniper Networks, Inc., Sunnyvale, CA (US)

(72) Inventors: Rahul Kulkarni, Bangalore (IN); Rathi Kartheek, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 192 days.

(21) Appl. No.: 14/265,321

(22) Filed: Apr. 29, 2014

(51) Int. Cl.
  *G06F 11/00* (2006.01)
  *G06F 11/18* (2006.01)
(52) U.S. Cl.
  CPC .................................... *G06F 11/181* (2013.01)
(58) Field of Classification Search
  USPC ......................................................... 714/47.3
  See application file for complete search history.

(56) References Cited

U.S. PATENT DOCUMENTS

| | | | | |
|---|---|---|---|---|
| 2005/0081124 A1* | 4/2005 | Luick | ................. | G06F 11/2007 714/56 |
| 2005/0144505 A1* | 6/2005 | Takeuchi | ............ | H04L 41/0631 714/4.12 |
| 2006/0179147 A1* | 8/2006 | Tran | .................... | G06F 11/2012 709/227 |
| 2010/0287419 A1* | 11/2010 | Saikkonen | ................ | H02J 3/48 714/47.1 |
| 2013/0138996 A1* | 5/2013 | Beyer | .................. | H04L 12/4625 714/4.2 |

* cited by examiner

*Primary Examiner* — Sarai Butler
(74) *Attorney, Agent, or Firm* — ALG Intellectual Property, LLC

(57) ABSTRACT

A computer-implemented method for detecting fault conditions experienced by remote physical ports may include (1) identifying a network connection between a first physical port operating in a first communication mode and a second physical port operating in a second communication mode, (2) monitoring at least one count that identifies the number of block-sized transmission errors encountered by the first physical port, (3) determining that the second physical port has experienced a fault condition based at least in part on the count that identifies the number of block-sized transmission errors encountered by the first physical port and then, in response to determining that the second physical port has experienced the fault condition, (4) deactivating the network connection to avoid dropping network traffic directed to the network connection. Various other systems, methods, and apparatuses are also disclosed.

20 Claims, 9 Drawing Sheets

```
                    Connection Status Information
                              400
------------------------------------------------------------------
**************************************************

Interface                      Connection Status
                               _____
et-2/0/0:0                     up
et-2/0/0:1                     up
et-2/0/0:2                     up
et-2/0/0:3                     up
et-2/0/1:0                     down
et-2/0/1:1                     down
et-2/0/1:2                     down
et-2/0/1:3                     down
et-2/0/2:0                     down
et-2/0/2:1                     down
et-2/0/2:2                     down
et-2/0/2:3                     down
et-2/0/3:0                     up
et-2/0/3:1                     up
et-2/0/3:2                     up
et-2/0/3:3                     up
et-2/0/4:0                     down
et-2/0/4:1                     down
et-2/0/4:2                     down
et-2/0/4:3                     down
    ⋮                              ⋮

Interface Identification Information
500

| ID | FPC | PIC | ifd | (pcs ptr) |
|----|-----|-----|-----|-----------|
| ⋮ | ⋮ | ⋮ | ⋮ | ⋮ |
| 11 | 2 | 10 | et-2/0/2:2 | 275bd7b8 |
| 12 | 2 | 11 | et-2/0/2:3 | 275bd920 |
| 13 | 2 | 12 | et-2/0/3:0 | 275bda88 |
| 14 | 2 | 13 | et-2/0/3:1 | 275bdbf0 |
| 15 | 2 | 14 | et-2/0/3:2 | 275bdd58 |
| 16 | 2 | 15 | et-2/0/3:3 | 275bdec0 |
| ⋮ | ⋮ | ⋮ | ⋮ | ⋮ |

FIG. 5

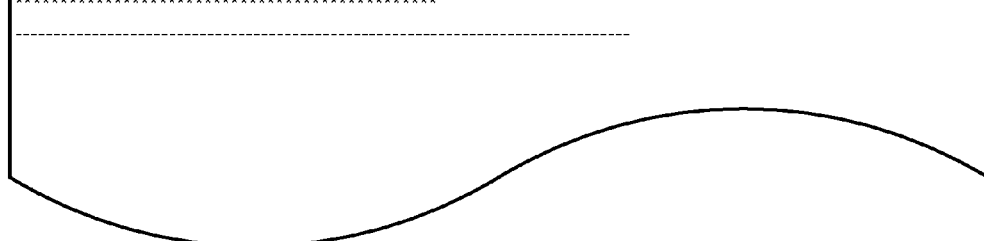
FIG. 6

```
                                    Count
                                    700
------------------------------------------------------------------
**********************************************

ID:                      15
Bit Errors Count:        00000000
Errored Blocks Count:    05754585
Last Second Delta:       00000510

**********************************************
------------------------------------------------------------------
```

```
                                    Count
                                    702
------------------------------------------------------------------
**********************************************

ID:                      16
Bit Errors Count:        00000000
Errored Blocks Count:    05758155
Last Second Delta:       00000510

```
                        Register Information
                                800

-------------------------------------------------------------------------------
***************************************************

Register Address      Register Name          Current Value (0x2b002c00)          revision               0x00010103
(0x2b002c04)          scratch                0x00000000
(0x2b002c08)          command_config         0x00228853
(0x2b002c0c)          mac_addr_0             0x0514964c
(0x2b002c10)          mac_addr_1             0x0000dce9
(0x2b002c14)          frm_length             0x000005f6
(0x2b002c1c)          rx_fifo_sections       0x00000000
(0x2b002c20)          tx_fifo_sections       0x00000003
(0x2b002c24)          rx_fifo_almost_f_e     0x00000000
(0x2b002c28)          tx_fifo_almost_f_e     0x00000000
(0x2b002c2c)          hashtable_load         0x00000000
(0x2b002c40)          fault_status           0x00000000
(0x2b002c44)          tx_ipg_length          0x0000000c
(0x2b002c48)          credit_trigger         0x00000000
(0x2b002c4c)          init_credit            0x00000008
(0x2b002c50)          credit_reg             0x00000008
(0x2b002c54)          pause_quanta[0]        0x0000ffff
(0x2b002c58)          pause_quanta[1]        0x00000000
(0x2b002c5c)          pause_quanta[2]        0x00000000
(0x2b002c60)          pause_quanta[3]        0x00000000
(0x2b002c64)          quanta_thresh[0]       0x00007fff
(0x2b002c68)          quanta_thresh[1]       0x00000000
(0x2b002c6c)          quanta_thresh[2]       0x00000000
(0x2b002c70)          quanta_thresh[3]       0x00000000
(0x2b002c74)          rx_pause_status        0x00000000
(0x2b002c7c)          ts_timestamp           0x00000000

SYSTEM, METHOD, AND APPARATUS FOR DETECTING FAULT CONDITIONS EXPERIENCED BY REMOTE PHYSICAL PORTS

BACKGROUND

Physical ports are often used to establish network connections that facilitate the flow of traffic within a computer network. For example, a network may include a network connection between a physical port of a router and another physical port of another router. In this example, the network connection may facilitate the flow of traffic between the router and the other router.

Unfortunately, this network connection may have certain shortcomings and/or limitations when the physical ports are set to operate in different communication modes. For example, the physical port may be set to operate in a 10 Gigabit per second (Gbps) mode, and the other physical port may be set to operate in a 40 Gbps mode. In the event that the 40 Gbps port experiences a fault condition, the physical coding sublayer (PCS) of the 40 Gbps port may transmit a fault notification to the PCS of the 10 Gbps port. However, the PCS of the 10 Gbps port may be unable to recognize and/or decode the fault notification due to the different architectures, protocols, and/or rates of the 10 and 40 Gbps modes. As a result, the network connection may appear active despite the fault condition experienced by the 40 Gbps port, thereby potentially leading to a black hole scenario in which the 10 Gbps port drops traffic directed to the network connection.

The instant disclosure, therefore, identifies and addresses a need for systems, methods, and apparatuses for detecting fault conditions experienced by remote physical ports.

SUMMARY

As will be described in greater detail below, the instant disclosure generally relates to systems, methods, and apparatuses for detecting fault conditions experienced by remote physical ports. In one example, a method for accomplishing such a task may include (1) identifying a network connection between a first physical port operating in a first communication mode and a second physical port operating in a second communication mode, (2) monitoring at least one count that identifies the number of block-sized transmission errors encountered by the first physical port, (3) determining that the second physical port has experienced a fault condition based at least in part on the count that identifies the number of block-sized transmission errors encountered by the first physical port and then, in response to determining that the second physical port has experienced the fault condition, (4) deactivating the network connection to avoid dropping network traffic directed to the network connection.

Similarly, a system incorporating the above-described method may include (1) an identification module, stored in memory, that identifies a network connection between a first physical port operating in a first communication mode and a second physical port operating in a second communication mode, (2) a monitoring module, stored in memory, that (A) monitors at least one count that identifies the number of block-sized transmission errors encountered by the first physical port and (B) determines that the second physical port has experienced a fault condition based at least in part on the count that identifies the number of block-sized transmission errors encountered by the first physical port, (4) a connection module, stored in memory, that deactivates the network connection to avoid dropping network traffic directed to the network connection in response to the determination that the second physical port has experienced the fault condition, and (5) at least one processor that executes the identification module, the monitoring module, and the connection module.

A corresponding apparatus may include (1) a first physical port that (A) operates in a first communication mode and (B) forms a network connection with a second physical port operating in a second communication mode, and (2) a link management component that (A) monitors at least one count that identifies the number of block-sized transmission errors encountered by the first physical port, (B) determines that the second physical port has experienced a fault condition based at least in part on the count that identifies the number of block-sized transmission errors encountered by the first physical port, and then (C) deactivates the network connection to avoid dropping network traffic directed to the network connection in response to the determination that the second physical port has experienced the fault condition.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of exemplary connection status information.

FIG. 5 is an illustration of exemplary interface identification information.

FIG. 6 is an illustration of exemplary counts that identify the number of block-sized transmission errors encountered by a physical port.

FIG. 7 is an illustration of exemplary counts that identify the number of block-sized transmission errors encountered by a physical port.

FIG. 8 is an illustration of exemplary register information.

Figure 1:
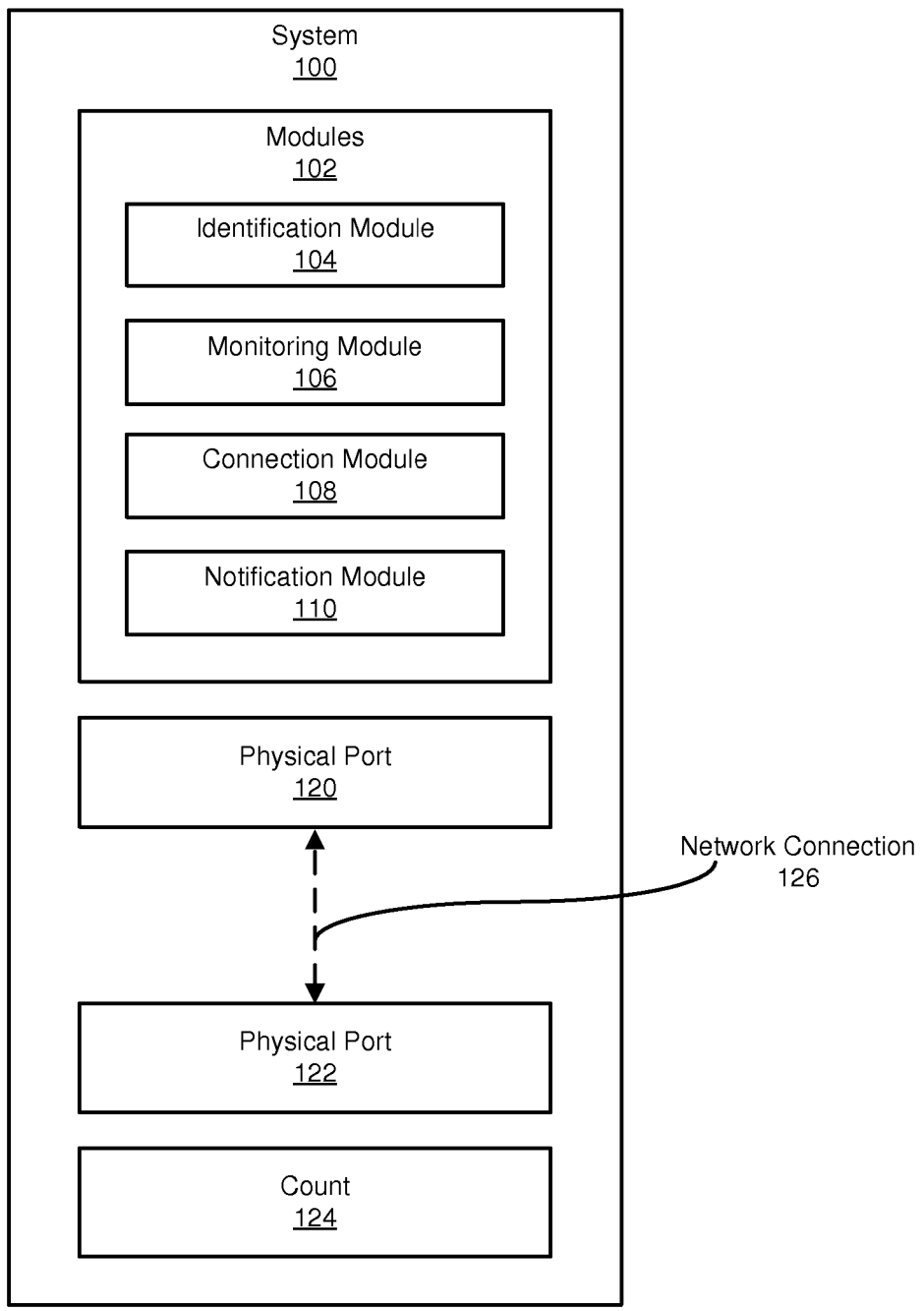
FIG. 1 is a block diagram of an exemplary apparatus for detecting fault conditions experienced by remote physical ports.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems, methods, and apparatuses for detecting fault conditions experienced by remote physical ports. As will be explained in greater detail below, by monitoring a count that identifies the number of block-sized transmission errors encountered by a local physical port connected to a remote physical port operating in a different communication mode, embodiments of the instant disclosure may determine that the count is increasing at a substantially constant rate. Embodiments of the instant disclosure may then determine that the remote physical port has experienced a fault condition based at least in part on the count increasing at the substantially constant rate. Accordingly, embodiments of the instant disclosure may detect the fault condition experienced by the remote physical port even without receiving any intelligible fault notifications from the remote physical port.

Moreover, by detecting the fault condition experienced by the remote physical port without receiving any intelligible fault notifications, embodiments of the instant disclosure may help prevent a black hole scenario in which the local physical port drops traffic directed to the remote physical port. Additionally or alternatively, by detecting the fault condition experienced by the remote physical port without receiving any intelligible fault notifications, embodiments of the instant disclosure may expedite and/or mitigate the process of debugging and/or resolving connectivity issues between the local and remote physical ports.

Figure 2:
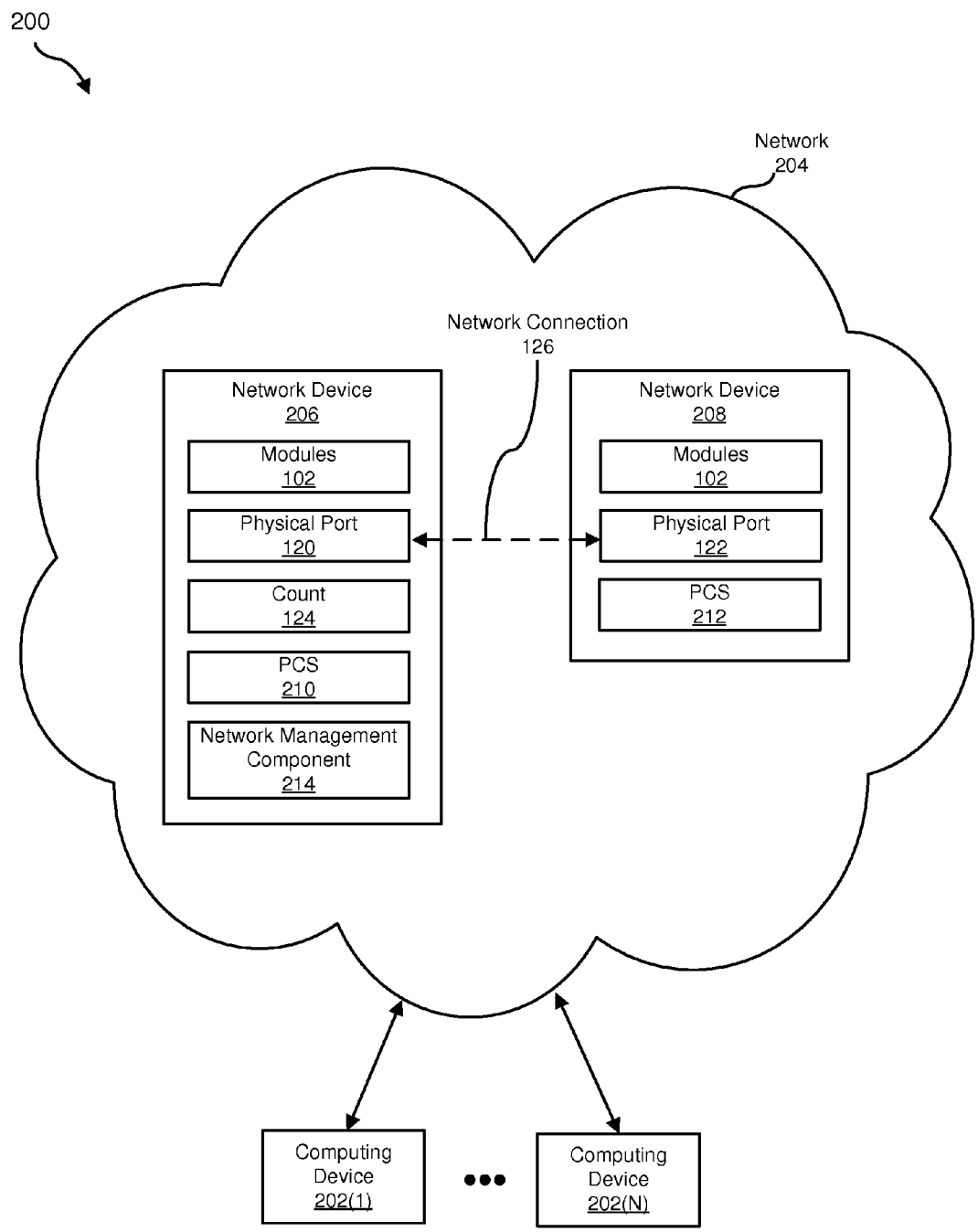
FIG. 2 is a block diagram of an exemplary apparatus for detecting fault conditions experienced by remote physical ports.

The following will provide, with reference to FIGS. 1 and 2, detailed descriptions of exemplary systems for detecting fault conditions experienced by remote physical ports. Detailed descriptions of corresponding computer-implemented methods will be provided in connection with FIG. 3. Detailed descriptions of exemplary connection status information and exemplary interface identification information will be provided in connection with FIGS. 4 and 5, respectively.

In addition, detailed descriptions of exemplary counts that identify the number of block-sized transmission errors encountered by a physical port will be provided in connection with FIGS. 6 and 7. Detailed descriptions of exemplary register information will be provided in connection with FIG. 8. Detailed descriptions of an exemplary apparatus for detecting fault conditions experienced by remote physical ports will be provided in connection with FIG. 9.

FIG. 1 is a block diagram of an exemplary system 100 for detecting fault conditions experienced by remote physical ports. As illustrated in this figure, exemplary system 100 may include one or more modules 102 for performing one or more tasks. For example, and as will be explained in greater detail below, exemplary system 100 may include an identification module 104 that identifies a network connection between a first physical port operating in a first communication mode and a second physical port operating in a second communication mode. Exemplary system 100 may also include a monitoring module 106 that (1) monitors at least one count that identifies the number of block-sized transmission errors encountered by the first physical port and (2) determines that the second physical port has experienced a fault condition based at least in part on the count that identifies the number of block-sized transmission errors encountered by the first physical port.

Moreover, and as will be described in greater detail below, exemplary system 100 may include a connection module 108 that deactivates the network connection to avoid dropping network traffic directed to the network connection in response to the determination that the second physical port has experienced the fault condition. Exemplary system 100 may further include a notification module 110 that notifies a network management component that the network connection has been deactivated to enable the network management component to redirect network traffic from the network connection to at least one additional network connection. Although illustrated as separate elements, one or more of modules 102 in FIG. 1 may represent portions of a single module or application (such as JUNIPER NETWORKS' JUNOS, CISCO SYSTEMS' INTERNETWORK OPERATING SYSTEM (IOS), and/or ALCATEL-LUCENT'S SERVICE ROUTER OPERATING SYSTEM (SR OS)).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as the devices illustrated in FIG. 2 (e.g., network devices 206 and 208), and/or apparatus 900 in FIG. 9.

As illustrated in FIG. 1, exemplary system 100 may also include one or more physical ports, such as physical ports 120 and 122. The phrase "physical port," as used herein, generally refers to any type or form of physical interface, device, and/or housing that forms at least a portion of a connection and/or link within a network. Examples of physical ports 120 and 122 include, without limitation, Quad Small Form-factor Pluggable (QSFP) ports, Ethernet ports, Fibre Channel ports, optical ports, InfiniBand ports, CXP connectors, Multiple-Fiber Push-On/Pull-Off (MPO) connectors, XAUI ports, XFP transceivers, XFI interfaces, C Form-factor Pluggable (CFP) transceivers, combinations of one or more of the same, or any other suitable physical ports.

In one embodiment, physical port 120 may be incorporated into and/or arranged along a Physical Line Card (PIC) or Physical Interface Module (PIM) installed on a network device. Additionally or alternatively, physical port 122 may be incorporated into and/or arranged along an additional PIC or PIM installed on an additional network device. The phrases "Physical Line Card" and "Physical Interface Module" and the corresponding abbreviations "PIC" and "PIM," as used herein, generally refer to any type or form of interface-specific card, blade, and/or module that includes a plurality of physical ports.

In one embodiment, physical ports 120 and 122 may be set to operate in different communication modes. For example, physical port 120 may be set to operate in a 10 Gbps mode that facilitates transmitting Ethernet frames at a rate of 10 Gbps. When set to operate in the 10 Gbps mode, physical port 120 may have 4 sub-ports used to transmit and/or receive Ethernet frames. The term "sub-port," as used herein, generally refers to any type or form of electrical and/or optical thread or channel of a physical port that facilitates communication and/or data transfer.

As an additional example, physical port 122 may be set to operate in a 40 Gbps mode that facilitates transmitting Ethernet frames at a rate of 40 Gbps. When set to operate in the 40 Gbps mode, physical port 122 may implement 4 multiplexed virtual lanes to transmit and/or receive Ethernet frames. The term "virtual lane," as used herein, generally refers to any type or form of data stream multiplexed along a single electrical and/or optical thread or channel of a physical port that facilitates communication and/or data transfer. The virtual lanes may transport 64-bit and/or 66-bit blocks of data.

Additionally or alternatively, the virtual lanes may multiplex the blocks of data at the bit level.

Although primarily discussed throughout the instant disclosure in terms of exemplary 10 and 40 Gbps modes, physical ports 120 and 122 may be set to operate in any communication modes that differ from each other. Examples of such communication modes include, without limitation, 10 Gbps modes, 40 Gbps modes, 100 Gbps modes, 240 Gbps modes, PCS Ethernet single-lane architectures, PCS Ethernet multi-lane distribution architectures, single-channel architectures, multi-channel architectures, combinations of one or more of the same, or any other suitable communication modes.

As illustrated in FIG. 1, exemplary system 100 may also include one or more network connections, such as network connection 126. The phrase "network connection," as used herein, generally refers to any type or form of physical connection and/or link that facilitates communication and/or data transfer within a network. In one embodiment, network connection 126 may represent a communication link formed between physical ports 120 and 122. Examples of network connection 126 include, without limitation, optical fiber connections, copper cable connections, Ethernet cable connections, CATegory (CAT) 6 cable connections, combinations of one or more of the same, or any other suitable network connection.

As illustrated in FIG. 1, exemplary system 100 may also include one or more counts, such as count 124. The phrase "count," as used herein, generally refers to any type or form of numerical representation, value, and/or reference that identifies the number of block-sized transmission errors encountered by a physical port. In one embodiment, count 124 may represent an errored block count maintained by the PCS of a local physical port. In this embodiment, count 124 may increase in number due at least in part to substantially unintelligible Ethernet frames (e.g., unintelligible fault notifications) transmitted by the PCS of a remote physical port.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 204 in communication with one or more computing devices 202(1)-(N).

In one embodiment, network 204 may include network devices 206 and 208. In this embodiment, network devices 206 and 208 may each be programmed with one or more of modules 102. Network device 206 may maintain count 124 and/or include physical port 120, PCS 210, and network management component 214. Additionally or alternatively, network device 208 may include physical port 122 and PCS 212.

The phrase "Physical Coding Sublayer" and the corresponding abbreviation "PCS," as used herein, generally refer to any type or form of component and/or module that encodes, decodes, transmits, and/or receives network traffic in connection with a physical port. In one embodiment, PCS 210 and PCS 212 may each represent a sublayer within the physical layer (sometimes also referred to as Layer 1) of the seven-layer Open Systems Interconnection (OSI) computer networking model. In this embodiment, PCS 210 and PCS 212 may define certain characteristics (such as the corresponding communication modes) of physical ports 120 and 122, respectively.

The phrase "network management component," as used herein, generally refers to any type or form of component and/or module that controls and/or directs the flow of network traffic within a network. In one embodiment, network management component 214 may redirect network traffic from an inactive network connection to an active network connection. Although illustrated as part of network device 206 in FIG. 2, network management component 214 may additionally or alternatively represent part of a centralized server (not illustrated in FIG. 2) included in network 204.

The phrase "network traffic," as used herein, generally refers to any type or form of data transfer occurring within a network and/or passing from one network to another. In one embodiment, network traffic may include one or more data packets transmitted from physical port 122 to physical port 120 via network connection 126. In this embodiment, network traffic may exclude one or more control packets transmitted from physical port 122 to physical port 120 in connection with the data packets.

As illustrated in FIG. 2, physical ports 120 and 122 may collectively form and/or establish network connection 126 within network 204. Network connection 126 may facilitate communication and/or data transfer between network devices 206 and 208. Although illustrated as single devices in FIG. 2, network devices 206 and 208 may each represent a plurality of network devices included in network 204.

In one embodiment, one or more of modules 102 from FIG. 1 may, when executed by at least one processor of network device 206 and/or network device 208, enable network device 206 and/or network device 208 to detect fault conditions experienced by remote physical ports. For example, and as will be described in greater detail below, one or more of modules 102 may cause network device 206 to (1) identify network connection 126 between physical port 120 operating in a first communication mode and physical port 122 operating in a second communication mode, (2) monitoring at least one count that identifies the number of block-sized transmission errors encountered by physical port 120, (3) determining that physical port 122 has experienced a fault condition based at least in part on the count that identifies the number of block-sized transmission errors encountered by physical port 120 and then, in response to determining that physical port 122 has experienced the fault condition, (4) deactivating network connection 126 to avoid dropping network traffic directed to network connection 126.

Computing devices 202(1)-(N) generally represent any type or form of computing device capable of reading computer-executable instructions. Examples of computing devices 202(1)-(N) include, without limitation, laptops, tablets, desktops, servers, cellular phones, Programmable Gate Arrays (FPGAs), Personal Digital Assistants (PDAs), multimedia players, embedded systems, wearable devices (e.g., smart watches, smart glasses, etc.), gaming consoles, portions of one or more of the same, combinations of one or more of the same, exemplary apparatus 900 in FIG. 9, or any other suitable computing devices.

Network devices 206 and 208 generally represent any type or form of computing device capable of facilitating the flow of traffic within a network. Examples of network devices 216(1)-(N) include, without limitation, routers, switches, network hubs, gateways, service delivery gateways, application servers, database servers, firewalls, Deep Packet Inspection (DPI) systems, nodes, bridges, desktops, multimedia players, embedded systems, gaming consoles, exemplary apparatus 900 in FIG. 9, portions of one or more of the same, combinations of one or more of the same, or any other suitable network devices.

Network 204 generally represents any type or form of medium and/or architecture capable of facilitating communication or data transfer. In one embodiment, network 204 may include wireless and/or wired connections. Network 204 may include one or more additional network devices not illustrated in FIG. 2. Examples of network 204 include, without limitation, intranets, Wide Area Networks (WANs), Local Area Networks (LANs), Personal Area Networks (PANs), the Internet, Internet Service Provider (ISP) networks, Power Line Communications (PLC) networks, cellular networks (e.g., Global System for Mobile Communications (GSM) networks), wireless networks, portions of one or more of the same, combinations of one or more of the same, or any other suitable network.

Figure 3:
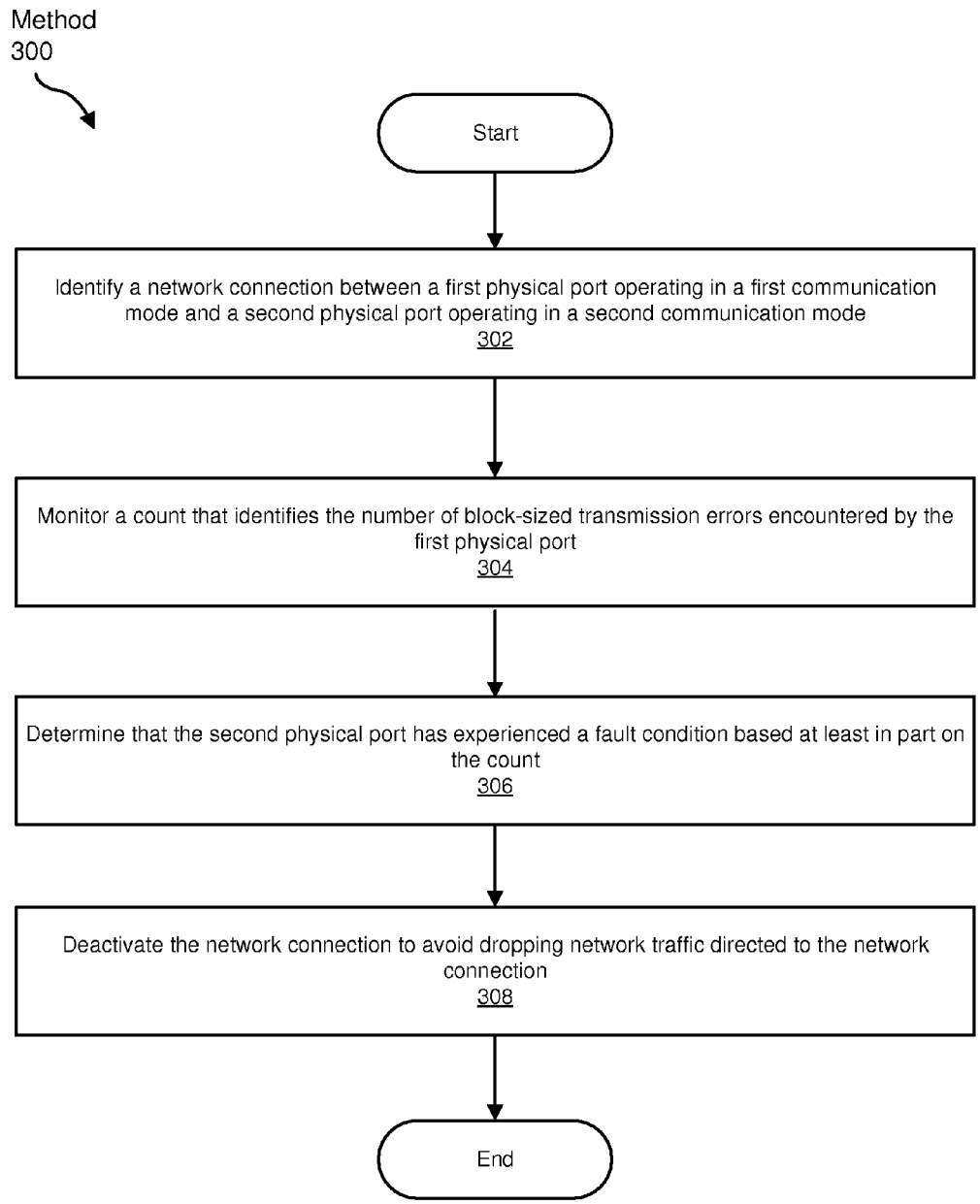
FIG. 3 is a flow diagram of an exemplary method for detecting fault conditions experienced by remote physical ports.

FIG. 3 is a flow diagram of an exemplary computer-implemented method 300 for detecting fault conditions experienced by remote physical ports. The steps shown in FIG. 3 may be performed by any suitable computer-executable code, computing system, and/or apparatus. In some embodiments, the steps shown in FIG. 3 may be performed by one or more of the components of system 100 in FIG. 1, system 200 in FIG. 2, and/or apparatus 900 in FIG. 9.

As illustrated in FIG. 3, at step 302 one or more of the systems described herein may identify a network connection between a first physical port operating in a first communication mode and a second physical port operating in a second communication mode. For example, identification module 104 may, as part of network device 206 in FIG. 2, identify network connection 126 between physical port 120 and physical port 122. In this example, physical port 120 may be operating in a communication mode that facilitates transmitting and/or receiving network traffic at a rate of 10 Gbps. Additionally or alternatively, physical port 122 may be operating in a communication mode that facilitates transmitting and/or receiving network traffic at a rate of 40 Gbps.

The systems described herein may perform step 302 in a variety of ways. In some examples, identification module 104 may identify network connection 126 based at least in part on a physical cable being inserted into physical port 120. For example, an administrator of network 204 may insert one end of an optical fiber cable into physical port 122. In this example, the administrator may insert another end of the optical fiber cable into physical port 120. Identification module 104 may then identify network connection 126 based at least in part on the other end of the optical fiber cable being inserted into physical port 120.

In some examples, identification module 104 may identify network connection 126 based at least in part on information about the configuration of network device 206 and/or physical port 120. For example, identification module 104 may identify information indicating that physical port 120 and physical port 122 are connected via network connection 126. Identification module 104 may then identify network connection 126 based at least in part on this information.

In some examples, identification module 104 may identify network connection 126 based at least in part on network traffic received at physical port 120. For example, network device 208 may receive a data packet from computing device 202(1) or computing device 202(N). Upon receiving the data packet, network device 208 may forward the data packet to network device 206 via network connection 126. Network device 206 may receive the data packet at physical port 120 via network connection 126. Identification module 104 may then identify network connection 126 based at least in part on the data packet received at physical port 120.

As illustrated in FIG. 3, at step 304 one or more of the systems described herein may monitor at least one count that identifies the number of block-sized transmission errors encountered by the first physical port. For example, monitoring module 106 may, as part of network device 206 in FIG. 2, monitor count 124 that identifies the number of block-sized transmission errors encountered by physical port 120. In this example, count 124 may be maintained by the PCS of physical port 120.

The phrase "block-sized transmission error," as used herein, generally refers to any type or form of error resulting from the transmission of a block of data. In one embodiment, a block-sized transmission error may result from the PCS's inability to recognize and/or decode a 64-bit or 66-bit block of data received at physical port 120. Additionally or alternatively, a block-sized transmission error may result from the PCS's inability to recognize and/or decode a 16-bit, 32-bit, 40-bit, 128-bit, 256-bit, or 320-bit block of data received at physical port 120.

The systems described herein may perform step 304 in a variety of ways. In some examples, monitoring module 106 may monitor count 124 over a specific period of time. For example, monitoring module 106 may monitor count 124 over a 1-second period of time. While monitoring count 124, monitoring module 106 may detect and/or identify each block-sized transmission error encountered by physical port 120 during this 1-second period of time based at least in part on count 124.

In some examples, monitoring module 106 may monitor count 124 on a substantially continuous basis. For example, monitoring module 106 may continually monitor count 124 to track the number of block-sized transmission errors encountered by physical port 120 during any interval of time. While monitoring count 124, monitoring module 106 may detect and/or identify each block-sized transmission error encountered by physical port 120 during any interval of time based at least in part on count 124.

In some examples, monitoring module 106 may track the amount of passing time between block-sized transmission errors encountered by physical port 120. For example, monitoring module 106 may observe that count 124 is increasing by 1 unit approximately every 2 milliseconds. In this example, monitoring module 106 may determine that physical port 120 is encountering block-sized transmission errors approximately every 2 milliseconds.

As illustrated in FIG. 3, at step 306 one or more of the systems described herein may determine that the second physical port has experienced a fault condition based at least in part on the count that identifies the number of block-sized transmission errors encountered by the first physical port. For example, monitoring module 106 may, as part of network device 206 in FIG. 2, determine that physical port 122 has experienced a fault condition based at least in part on count 124. The phrase "fault condition," as used herein, generally refers to any type or form of hardware, software, and/or firmware failure or malfunction that renders a physical port unable to facilitate the flow of network traffic via a network connection.

The systems described herein may perform step 306 in a variety of ways. In some examples, monitoring module 106 may determine that physical port 122 has experienced the fault condition based at least in part on count 124 increasing at a substantially constant rate. For example, in the event that physical port 122 experiences a fault condition, the PCS of physical port 122 may transmit a fault notification to physical port 122 via network connection 126 approximately every 2 milliseconds. The phrase "fault notification," as used herein, generally refers to any type or form of notification, communication, and/or information indicating that a physical port is experiencing a fault condition.

Since, in this example, physical ports 120 and 122 are operating in different communication modes, physical ports 120 and 122 may be somewhat incompatible with each other.

This incompatibility may prevent the PCS of physical port 120 from being able to recognize and/or decode the fault notifications transmitted by the PCS of physical port 122, thereby rendering these fault notifications substantially unintelligible to the PCS of physical port 120. As a result, these substantially unintelligible fault notifications may appear to be block-sized transmission errors to the PCS of physical port 120.

Consequently, the PCS of physical port 120 may increase count 124 by 1 unit for each substantially unintelligible fault notification received from the PCS of physical port 122. For example, while physical port 122 is experiencing the fault condition, the PCS of physical port 120 may receive a substantially unintelligible fault notification from physical port 122 via network connection 126 approximately every 2 milliseconds. As a result, the PCS of physical port 120 may increase count 124 by 1 unit approximately every 2 milliseconds.

While monitoring count 124, monitoring module 106 may determine that count 124 is increasing at a substantially constant rate. For example, while monitoring count 124 over a 1-second period of time or on a substantially continuous basis, monitoring module 106 may determine that count 124 is increasing at a substantially constant rate of 1 unit approximately every 2 milliseconds. In this example, count 124 may increase at the substantially constant rate only in the event that physical port 122 is experiencing a fault condition.

Additionally or alternatively, monitoring module 106 may determine that physical port 122 has experienced a fault condition based at least in part on count 124 increasing at a substantially constant rate. For example, monitoring module 106 may know and/or be aware that count 124 increases at a substantially constant rate of 1 unit approximately every 2 milliseconds only in the event that physical port 122 is experiencing a fault condition. As a result, monitoring module 106 may determine that physical port 122 is experiencing a fault condition since count 124 is increasing at the substantially constant rate.

In some examples, monitoring module 106 may determine that physical port 122 has experienced a fault condition based at least in part on physical port 120 not encountering any bit errors while count 124 increases at a substantially continuous rate. For example, monitoring module 106 may determine that physical port 120 did not encounter any bit errors while count 124 increased at a substantially constant rate of 1 unit approximately every 2 milliseconds. In this example, monitoring module 106 may know and/or be aware that failure to encounter any bit errors while count 124 increases at the substantially constant rate may suggest that physical port 122 has experienced a fault condition. Accordingly, monitoring module 106 may determine that physical port 122 has experienced a fault condition since physical port 120 did not encounter any bit errors while count 124 increased at the substantially constant rate.

In some examples, monitoring module 106 may determine that physical port 122 has experienced a fault condition based at least in part on network connection 126 being idle while count 124 increases at a substantially continuous rate. For example, monitoring module 106 may determine that network connection 126 is idle such that no network traffic is flowing from physical port 122 to physical port 120 while count 124 increases at a substantially constant rate of 1 unit approximately every 2 milliseconds. In this example, monitoring module 106 may know and/or be aware that such idleness while count 124 increases at the substantially constant rate may suggest that physical port 122 has experienced a fault condition. Accordingly, monitoring module 106 may determine that physical port 122 has experienced a fault condition since network connection 126 is idle while count 124 increases at the substantially constant rate.

The term "idle," as used herein, generally refers to any type or form of operating state and/or condition in which no network traffic is flowing across a network connection. Even in the event that network connection 126 is idle, physical port 120 may still receive certain control packets from physical port 122 via network connection 126. For example, the PCS of physical port 122 may transmit control packets to the PCS of physical port 120 in connection with network traffic and/or fault notifications. By transmitting these control packets to the PCS of physical port 120, the PCS of physical port 122 may warn the PCS of physical port 120 to expect impending network traffic and/or fault notifications. However, since physical ports 120 and 122 are operating in different communication modes, such network traffic and/or fault notifications may appear substantially unintelligible to the PCS of physical port 120.

In some examples, monitoring module 106 may determine that physical port 122 has experienced a fault condition based at least in part on count 124 being equivalent to the maximum number of fault notifications potentially transmitted by the PCS of physical port 122 over a specific period of time. For example, monitoring module 106 may determine that count 124 increased by approximately 500 units over a 1-second period of time. In this example, monitoring module 106 may know and/or be aware that the PCS of physical port 120 is only capable of receiving approximately 500 fault notifications over the 1-second period of time. As a result, monitoring module 106 may determine that physical port 122 has experienced a fault condition since count 124 increased by approximately 500 units (which is equivalent to the maximum number of fault notifications) over the 1-second period of time.

As illustrated in FIG. 3, at step 308 one or more of the systems described herein may deactivate the network connection to avoid dropping network traffic directed to the network connection. For example, connection module 108 may, as part of network device 206 and/or network device 208 in FIG. 2, deactivate network connection 126 to avoid dropping network traffic directed to network connection 126. Connection module 108 may initiate this deactivation process in response to the determination that physical port 122 has experienced a fault condition. By deactivating network connection 126, connection module 108 may help prevent a black hole scenario in which physical port 120 drops network traffic directed to physical port 122.

The systems described herein may perform step 308 in a variety of ways. In some examples, connection module 108 may deactivate network connection 126 by deactivating physical port 120. For example, connection module 108 may deactivate physical port 120. By deactivating physical port 120, connection module 108 may effectively bring down the communication link formed between physical ports 120 and 122 by network connection 126. Additionally or alternatively, by deactivating physical port 120, connection module 108 may help prevent a black hole scenario in which physical port 120 drops network traffic that is (1) received by network device 206 and (2) directed to network device 208 via network connection 126.

In some examples, connection module 108 may deactivate network connection 126 by deactivating physical port 122. For example, connection module 108 may deactivate physical port 122. By deactivating physical port 122, connection module 108 may effectively bring down the communication link formed between physical ports 120 and 122 by network connection 126. Additionally or alternatively, by deactivating physical port 122, connection module 108 may help prevent a black hole scenario in which physical port 122 drops network traffic that is (1) received by network device 208 and (2) directed to network device 206 via network connection 126.

In some examples, exemplary method 300 may include one or more additional steps not illustrated in FIG. 3. In one example, one or more of the systems described herein may notify a network management component that the network connection has been deactivated. For example, notification module 110 may, as part of network device 206 and/or network device 208 in FIG. 2, notify network management component 214 that network connection 126 has been deactivated. By notifying network management component 214 in this way, notification module 110 may enable network management component 214 to redirect network traffic from network connection 126 to at least one additional network connection (not illustrated in FIG. 2).

As another example, one or more of the systems described herein may reactivate the network connection to facilitate the flow of network traffic. For example, connection module 108 may, as part of network device 206 and/or network device 208 in FIG. 2, reactivate network connection 126 to facilitate the flow of network traffic. Connection module 108 may initiate this reactivation process in response to a determination that physical port 122 is no longer experiencing a fault condition.

The systems described herein may perform this additional step in a variety of ways. In some examples, connection module 108 may reactivate network connection 126 by reactivating physical port 120. For example, connection module 108 may reactivate physical port 120. By reactivating physical port 120, connection module 108 may effectively bring back up the communication link formed between physical ports 120 and 122 by network connection 126.

Additionally or alternatively, connection module 108 may reactivate network connection 126 by reactivating physical port 122. For example, connection module 108 may reactivate physical port 122. By reactivating physical port 122, connection module 108 may effectively bring back up the communication link formed between physical ports 120 and 122 by network connection 126.

In some examples, monitoring module 106 may determine that physical port 122 is no longer experiencing a fault condition based at least in part on count 124 no longer increasing at a substantially constant rate. For example, after deactivation of network connection 126, monitoring module 106 may continue to monitor count 124. While continuing to monitor count 124, monitoring module 106 may determine that count 124 has not increased at all over a specific period of time. Monitoring module 106 may then determine that physical port 122 is no longer experiencing a fault condition since count 124 has not increased at all over the specific period of time. In response to the determination that physical port 122 is no longer experiencing a fault condition, connection module 108 may reactivate network connection 126 to facilitate the flow of network traffic.

FIGS. 4-8 illustrate exemplary information and counts in connection with a specific example of detecting a fault condition experienced by a remote physical port. In this specific example, a network administrator may accidentally connect a 10 Gbps port included on a PIC of one router to a 40 Gbps port included on a PIC of another router. This accident may occur due at least in part to such 10 and 40 Gbps ports having substantially the same appearance. In other words, the network administrator may have mistaken the 10 Gbps port for a 40 Gbps port or the 40 Gbps port for a 10 Gbps port.

In the event that the 40 Gbps port experiences a fault condition, the PCS of the 40 Gbps port may transmit fault notifications to the PCS of the 10 Gbps port at a substantially constant rate of approximately 510 notifications per second. However, since these ports are operating in different communication modes, the PCS of the 10 Gbps port may be unable to recognize and/or decode the fault notifications transmitted by the PCS of the 40 Gbps port, thereby rendering these fault notifications substantially unintelligible to the PCS of the 10 Gbps port. As a result, the PCS of the 10 Gbps port may fail to deactivate the 10 Gbps port, potentially leading to a black hole scenario in which the 10 Gbps port drops traffic directed to the 40 Gbps port.

Continuing with this example, the 10 Gbps port may have 4 sub-ports (referred to as 2/0/3:0, 2/0/3:1, 2/0/3:2, and 2/0/3:4 in FIGS. 4 and 5) used to transmit and/or receive Ethernet frames. In contrast, the 40 Gbps port may implement a PCS Ethernet multi-lane distribution architecture to transmit and/or receive Ethernet frames. Since, in this example, the PCS of the 10 Gbps port failed to deactivate the 10 Gbps port in response to the fault notifications transmitted by the PCS of the 40 Gbps port, these 4 sub-ports may remain up despite the fault condition experienced by the 40 Gbps port.

As illustrated in FIG. 4, connection status information 400 may identify various sub-ports of the physical ports included on the router (in this example, "et-2/0/0:0" through "et-2/0/4:3") and the corresponding connection statuses of these sub-ports (in this example, "up" or "down"). As demonstrated by connection status information 400, the 2/0/3:0, 2/0/3:1, 2/0/3:2, and 2/0/3:4 sub-ports of the 10 Gbps port may remain up despite the fault condition experienced by the 40 Gbps port.

As illustrated in FIG. 5, interface identification information 500 may identify various sub-ports of the physical ports included on the router (in this example, "et-2/0/2:2" through "et-2/0/3:3"), various device identifiers assigned to these sub-ports (in this example, "11" through "16"), various PICs corresponding to these sub-ports (in this example, "10" through "15"), the Flexible PIC Concentrator (FPC) corresponding to these sub-ports (in this example, "2"), and various pointers to the PCSes of these sub-ports (in this example, "275bd7b8," through "275bdec0"). As demonstrated by interface identification information 500, the 2/0/3:0, 2/0/3:1, 2/0/3:2, and 2/0/3:4 sub-ports of the 10 Gbps port may be represented by the 13, 14, 15, and 16 device identifiers, respectively.

As illustrated in FIG. 6, count 124 may identify the device identifier assigned to the sub-port associated with count 124 (in this example, "13"), a bit errors count that identifies the number of bit errors encountered by this sub-port (in this example, "00000000"), an errored blocks count that identifies the total number of block-sized transmission errors encountered by this sub-port (in this example, "05727555"), and a last second delta that identifies the number of block-sized transmission errors encountered by this sub-port over the last 1-second period of time (in this example, "00000510").

As further illustrated in FIG. 6, count 600 may identify the device identifier assigned to the sub-port associated with count 600 (in this example, "14"), a bit errors count that identifies the number of bit errors encountered by this sub-port (in this example, "00000000"), an errored blocks count that identifies the total number of block-sized transmission errors encountered by this sub-port (in this example, "05733675"), and a last second delta that identifies the number of block-sized transmission errors encountered by this sub-port over the last 1-second period of time (in this example, "00000510").

As illustrated in FIG. 7, count 700 may identify the device identifier assigned to the sub-port associated with count 700 (in this example, "15"), a bit errors count that identifies the number of bit errors encountered by this sub-port (in this example, "00000000"), an errored blocks count that identifies the total number of block-sized transmission errors encountered by this sub-port (in this example, "05754585"), and a last second delta that identifies the number of block-sized transmission errors encountered by this sub-port over the last 1-second period of time (in this example, "00000510").

As further illustrated in FIG. 7, count 702 may identify the device identifier assigned to this sub-port associated with count 702 (in this example, "16"), a bit errors count that identifies the number of bit errors encountered by this sub-port (in this example, "00000000"), an errored blocks count that identifies the total number of block-sized transmission errors encountered by this sub-port (in this example, "05758155"), and a last second delta that identifies the number of block-sized transmission errors encountered by this sub-port over the last 1-second period of time (in this example, "00000510").

As illustrated in FIG. 8, register information 800 may identify various addresses of registers associated with the 10 Gbps port (in this example, "0x2b002c00" through "0x2b002c7c"), the names of these registers (in this example, "revision" through "ts_timestamp"), and the current values of these registers (in this example, "0x00010103" through "0x00000000"). As demonstrated by register information 800, the "fault_status" register may currently have a "0x00000000" value indicating that no local or remote fault conditions have been detected in connection with the 10 Gbps port.

In this example, a link management component (such as link management component 940 in FIG. 9) may monitor counts 124, 600, 700, and/or 702 on a substantially continuous basis. While monitoring counts 124, 600, 700 and/or 702, the link management component may determine that each of counts 124, 600, 700, and/or 702 are increasing at a substantially constant rate. For example, the link management component may determine that each of counts 124, 600, 700, and/or 702 increased by 510 units over the last 1-second period of time. Counts 124, 600, 700, and/or 702 may increase by 510 units per second only in the event that the 40 Gbps is experiencing a fault condition.

Accordingly, the link management component may determine that the 40 Gbps port has experienced a fault condition since each of counts 124, 600, 700, and/or 702 increased by 510 units over the last 1-second period of time. The link management component may arrive at this determination even though (1) the PCS of the 10 Gbps port has not received any intelligible fault notifications from the PCS of the 40 Gbps port and (2) the "fault_status" register associated with the 10 Gbps port does not indicate any local or remote fault conditions.

Figure 9:
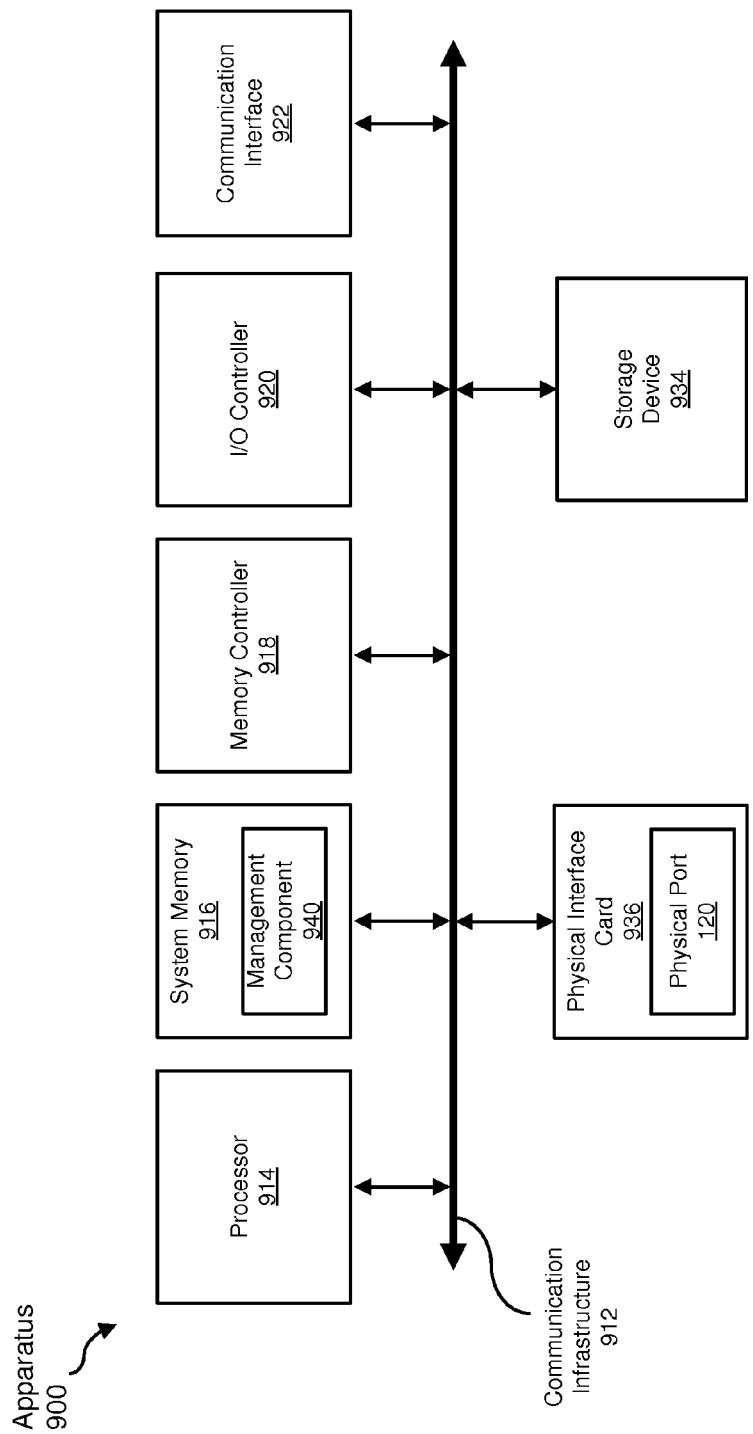
FIG. 9 is a block diagram of an exemplary apparatus for detecting fault conditions experienced by remote physical ports.

FIG. 9 is a block diagram of an exemplary apparatus 900 capable of implementing and/or being used in connection with one or more of the embodiments described and/or illustrated herein. In some embodiments, all or a portion of apparatus 900 may perform and/or be a means for performing, either alone or in combination with other elements, one or more of the steps described in connection with FIG. 3. All or a portion of apparatus 900 may also perform and/or be a means for performing and/or implementing any other steps, methods, or processes described and/or illustrated herein. In one example, apparatus 900 may include physical port 120 from FIG. 1.

Apparatus 900 broadly represents any type or form of electrical load, including a single or multi-processor computing device or system capable of executing computer-readable instructions. Examples of apparatus 900 include, without limitation, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), workstations, laptops, client-side terminals, servers, distributed computing systems, mobile devices, combinations of one or more of the same, or any other type or form of apparatus or device.

Apparatus 900 may be programmed, configured, and/or otherwise designed to comply with one or more networking protocols. According to certain embodiments, apparatus 900 may be designed to work with protocols of one or more layers of the OSI reference model, such as a physical layer protocol, a link layer protocol, a network layer protocol, a transport layer protocol, a session layer protocol, a presentation layer protocol, and/or an application layer protocol. For example, apparatus 900 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Apparatus 900 may include various network and/or computing components. For example, apparatus 900 may include at least one processor 914 and a system memory 916. Processor 914 generally represents any type or form of processing unit capable of processing data or interpreting and executing instructions. For example, processor 914 may represent an application-specific integrated circuit (ASIC), a system on a chip (e.g., a network processor), a hardware accelerator, a general purpose processor, and/or any other suitable processing element.

Processor 914 may process data according to one or more of the networking protocols discussed above. For example, processor 914 may execute or implement a portion of a protocol stack, may process packets, may perform memory operations (e.g., queuing packets for later processing), may execute end-user applications, and/or may perform any other processing tasks.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments apparatus 900 may include both a volatile memory unit (such as, for example, system memory 916) and a non-volatile storage device (such as, for example, primary storage device 932, as described in detail below). System memory 916 may be implemented as shared memory and/or distributed memory in a network device. Furthermore, system memory 916 may store packets and/or other information used in networking operations.

Additionally or alternatively, system memory may be programmed with a link management component 940. Link management component 940 generally represents any type or form of hardware, software, and/or firmware component used to detect fault conditions experienced by remote physical ports. In one embodiment, link management component 940 may include one or more of modules 102 in FIG. 1.

In certain embodiments, exemplary apparatus 900 may also include one or more components or elements in addition to processor 914 and system memory 916. For example, as illustrated in FIG. 9, apparatus 900 may include a memory controller 918, an Input/Output (I/O) controller 920, and a communication interface 922, each of which may be interconnected via communication infrastructure 912. Communication infrastructure 912 generally represents any type or form of infrastructure capable of facilitating communication between one or more components of a computing device. Examples of communication infrastructure 912 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 918 generally represents any type or form of device capable of handling memory or data or controlling communication between one or more components of apparatus 900. For example, in certain embodiments memory controller 918 may control communication between processor 914, system memory 916, and I/O controller 920 via communication infrastructure 912. In some embodiments, memory controller 918 may include a Direct Memory Access (DMA) unit that may transfer data (e.g., packets) to or from a link adapter.

I/O controller 920 generally represents any type or form of device or module capable of coordinating and/or controlling the input and output functions of a computing device. For example, in certain embodiments I/O controller 920 may control or facilitate transfer of data between one or more elements of apparatus 900, such as processor 914, system memory 916, communication interface 922, and storage interface 930.

Communication interface 922 broadly represents any type or form of communication device or adapter capable of facilitating communication between exemplary apparatus 900 and one or more additional devices. For example, in certain embodiments communication interface 922 may facilitate communication between apparatus 900 and a private or public network including additional apparatuses. Examples of communication interface 922 include, without limitation, a link adapter, a wired network interface (such as a network interface card), a wireless network interface (such as a wireless network interface card), and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 922 may also represent a host adapter configured to facilitate communication between apparatus 900 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also enable apparatus 900 to engage in distributed or remote computing. For example, communication interface 922 may receive instructions from a remote device or send instructions to a remote device for execution.

As illustrated in FIG. 9, exemplary apparatus 900 may also include a storage device 934 coupled to communication infrastructure 912. Storage device 934 generally represents any type or form of storage device or medium capable of storing data and/or other computer-readable instructions. For example, storage device 934 may represent a magnetic disk drive (e.g., a so-called hard drive), a solid state drive, a floppy disk drive, a magnetic tape drive, an optical disk drive, a flash drive, or the like.

In certain embodiments, storage device 934 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 934 may also include other similar structures or devices for allowing computer software, data, or other computer-readable instructions to be loaded into apparatus 900. For example, storage device 934 may be configured to read and write software, data, or other computer-readable information. Storage device 934 may be a part of apparatus 900 or may be separate devices accessed through other interface systems.

Many other devices or subsystems may be connected to apparatus 900. Conversely, all of the components and devices illustrated in FIG. 9 need not be present to practice the embodiments described and/or illustrated herein. The devices and subsystems referenced above may also be interconnected in different ways from those shown in FIG. 9. Apparatus 900 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may receive count-related data to be transformed, transform the count-related data, output and use a result of the transformation to detect a fault condition experienced by a remote physical port, and store the result of the transformation to facilitate detecting a fault condition experienced by a remote physical port at a future time. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   identifying a network connection between a first physical port operating in a first communication mode and a second physical port operating in a second communication mode;
   monitoring at least one count that identifies the number of block-sized transmission errors encountered by the first physical port;
   determining, based at least in part on the count that identifies the number of block-sized transmission errors encountered by the first physical port, that the second physical port has experienced a fault condition;
   in response to determining that the second physical port has experienced the fault condition, deactivating the network connection to avoid dropping network traffic directed to the network connection.

2. The method of claim 1, wherein:
   the first communication mode enables the first physical port to receive network traffic at a rate of 10 gigabits per second;
   the second communication mode enables the second physical port to transmit network traffic at a rate of 40 gigabits per second.

3. The method of claim 1, wherein:
   monitoring the count that identifies the number of block-sized transmission errors encountered by the first physical port comprises monitoring the count over a specific period of time;
   determining that the second physical port has experienced the fault condition comprises:
      determining, while monitoring the count over the specific period of time, that the count is increasing at a substantially constant rate;
      determining, based at least in part on the count increasing at the substantially constant rate, that the second physical port has experienced the fault condition.

4. The method of claim 3, wherein determining that the second physical port has experienced the fault condition comprises:
   determining that the first physical port did not encounter any bit errors during the specific period of time;
   determining that the second physical port has experienced the fault condition based at least in part on:
      the count increasing at the substantially constant rate;
      the first physical port not encountering any bit errors during the specific period of time.

5. The method of claim 3, wherein determining that the count is increasing at the substantially constant rate comprises:
   receiving, at a physical coding sublayer of the first physical port, a plurality of fault notifications that are substantially unintelligible to the physical coding sublayer of the first physical port due at least in part to the incompatibility between the first and second communication modes;
   determining that the count is increasing at the substantially constant rate over the specific period of time due at least in part to the physical coding sublayer of the first physical port receiving the plurality of substantially unintelligible fault notifications.

6. The method of claim 5, wherein receiving the plurality of fault notifications that are substantially unintelligible to the physical coding sublayer of the first physical port comprises receiving the plurality of substantially unintelligible fault notifications from a physical coding sublayer of the second physical port via the network connection at the substantially constant rate.

7. The method of claim 3, wherein determining that the second physical port has experienced the fault condition comprises:

determining that the network connection is idle such that no network traffic is flowing from the second physical port to the first physical port during the specific period of time;
determining that the second physical port has experienced the fault condition based at least in part on:
the count increasing at the substantially constant rate;
the network connection being idle during the specific period of time.

8. The method of claim 1, wherein:
monitoring the count that identifies the number of block-sized transmission errors encountered by the first physical port comprises monitoring the count over a specific period of time;
determining that the second physical port has experienced the fault condition comprises:
determining that the count is equivalent to the maximum number of fault notifications capable of being received by the first physical port over the specific period of time;
determining, based at least in part on the count being equivalent to the maximum number of fault notifications, that the second physical port has experienced the fault condition.

9. The method of claim 1, wherein deactivating the network connection to avoid dropping network traffic directed to the network connection comprises at least one of:
deactivating the first physical port;
deactivating the second physical port.

10. The method of claim 1, further comprising notifying a network management component that the network connection has been deactivated to enable the network management component to redirect network traffic from the network connection to at least one additional network connection.

11. The method of claim 1, further comprising:
after deactivating the network connection:
continuing to monitor the count over a specific period of time;
determining, while continuing to monitor the count, that the count has not increased over the specific period of time;
determining, based at least in part on the count not increasing over the specific period of time, that the second physical port is no longer experiencing the fault condition;
in response to determining that the second physical port is no longer experiencing the fault condition, reactivating the network connection to facilitate network traffic.

12. A system comprising:
an identification module, stored in memory, that identifies a network connection between a first physical port operating in a first communication mode and a second physical port operating in a second communication mode;
a monitoring module, stored in memory, that:
monitors at least one count that identifies the number of block-sized transmission errors encountered by the first physical port;
determines that the second physical port has experienced a fault condition based at least in part on the count that identifies the number of block-sized transmission errors encountered by the first physical port;
a connection module, stored in memory, that deactivates the network connection to avoid dropping network traffic directed to the network connection in response to the determination that the second physical port has experienced the fault condition;
at least one processor that executes the identification module, the monitoring module, and the connection module.

13. The system of claim 12, wherein:
the first communication mode enables the first physical port to receive network traffic at a rate of 10 gigabits per second;
the second communication mode enables the second physical port to transmit network traffic at a rate of 40 gigabits per second.

14. The system of claim 12, wherein the monitoring module:
monitors the count over a specific period of time;
determines that the count is increasing at a substantially constant rate over the specific period of time;
determines, based at least in part on the count increasing at the substantially constant rate over the specific period of time, that the second physical port has experienced the fault condition.

15. The system of claim 14, wherein the monitoring module:
determines that the first physical port did not encounter any bit errors during the specific period of time;
determines that the second physical port has experienced the fault condition based at least in part on:
the count increasing at the substantially constant rate;
the first physical port not encountering any bit errors during the specific period of time.

16. The system of claim 15, wherein the monitoring module determines that the count is increasing at the substantially constant rate over the specific period of time due at least in part to a plurality of fault notifications that are substantially unintelligible to a physical coding sublayer of the first physical port.

17. The system of claim 16, wherein the plurality of substantially unintelligible fault notifications are received by the physical coding sublayer of the first physical port from a physical coding sublayer of the second physical port at the substantially constant rate.

18. The system of claim 14, wherein the monitoring module:
determines that the network connection is idle such that no network traffic is flowing from the second physical port to the first physical port during the specific period of time;
determines that the second physical port has experienced the fault condition based at least in part on:
the count increasing at the substantially constant rate;
the network connection being idle during the specific period of time.

19. The system of claim 12, wherein the connection module deactivates the network connection by at least one of:
deactivating the first physical port;
deactivating the second physical port.

20. An apparatus comprising:
a first physical port that:
operates in a first communication mode;
forms a network connection with a second physical port operating in a second communication mode;
a link management component that:
monitors at least one count that identifies the number of block-sized transmission errors encountered by the first physical port;
determines, based at least in part on the count that identifies the number of block-sized transmission errors encountered by the first physical port, that the second physical port has experienced a fault condition;

deactivates the network connection to avoid dropping network traffic directed to the network connection in response to the determination that the second physical port has experienced the fault condition.

* * * * *